(No Model.)

H. N. & G. F. MARSTON.
VEGETABLE, &c., CUTTER.

No. 596,277.  Patented Dec. 28, 1897.

Witnesses
Jas. H. Blackwood
Albert B. Blackwood.

Inventors
Harry N. Marston
George F. Marston
per H. W. Cragin, Attorney

UNITED STATES PATENT OFFICE.

HARRY N. MARSTON AND GEORGE F. MARSTON, OF LEBANON, NEW HAMPSHIRE.

VEGETABLE, &c., CUTTER.

SPECIFICATION forming part of Letters Patent No. 596,277, dated December 28, 1897.

Application filed February 5, 1897. Serial No. 622,167. (No model.)

*To all whom it may concern:*

Be it known that we, HARRY N. MARSTON and GEORGE F. MARSTON, citizens of the United States, residing at Lebanon, in the county of Grafton and State of New Hampshire, have invented certain new and useful Improvements in Vegetable, &c., Cutters; and we do declare the following to be a full, clear, and exact description of the invention, such as will enable others skilled in the art to which it appertains to make and use the same, reference being had to the accompanying drawings, and to the letters of reference marked thereon, which form a part of this specification.

The feeding of roots and vegetables to cattle during the winter is very beneficial; but it is well known that the feeding of whole vegetables, &c., is attended with great risk, owing to the danger from choking. There are several power-cutters, but the small farmer cannot afford the expense of one and is therefore obliged to use an ax or shovel, either of which only partially breaks up the roots, &c., or run the risk of feeding whole.

The object of this invention is to provide a cutter which can be bought as cheaply as an ax or shovel and do much more effective work than either and speedily bring the roots or vegetables to a proper condition for feeding.

The nature of the invention will be described below and pointed out in the claim.

Figure 1:
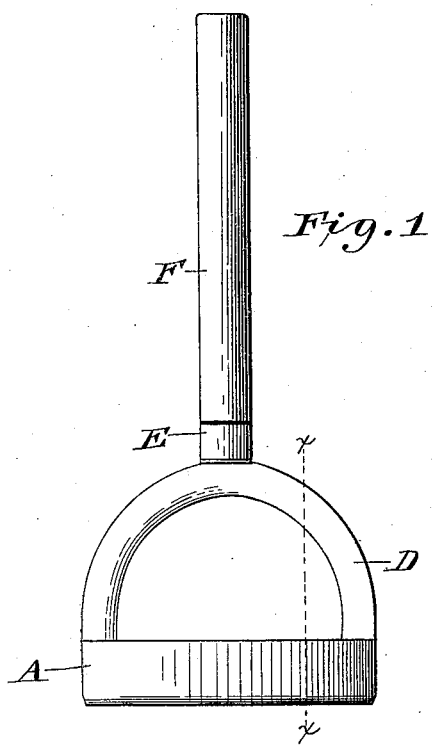
Figure 2:
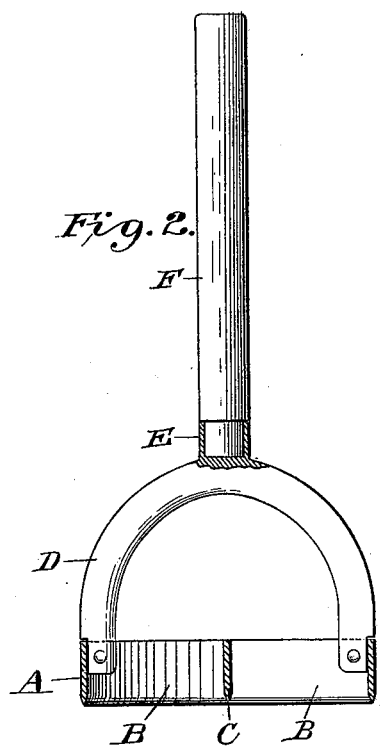
Figure 3:
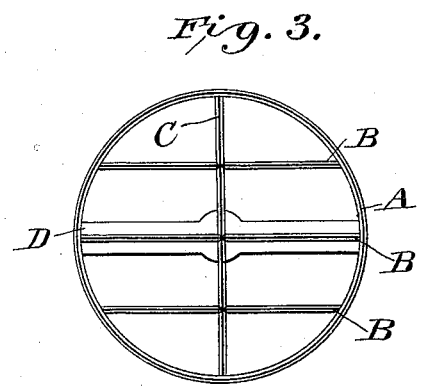
Figure 4:
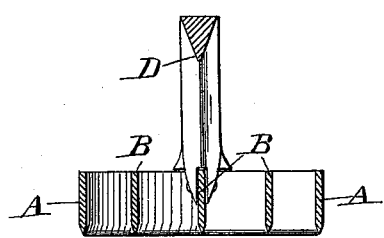

In the drawings, Figure 1 is a side elevation. Fig. 2 is a side elevation, partly in section. Fig. 3 is a bottom plan view. Fig. 4 is a vertical section on line $x$ $x$ of Fig. 1.

Like letters refer to like parts.

A represents the annular knife. Within its periphery are three equidistant parallel interior knives B B and the interior knife C, centrally bisecting knives B or forming right angles with them. This arrangement provides for sufficiently fine chopping and also leaves eight open spaces within the annular knife for the material to freely pass upward.

D represents a semicircular yoke or bail. This may be securely attached to the circular knife and is shown here as directly over and following the cut of the central one of the parallel knives B; but it might be placed over knife C. To prevent the material coming up between the knives from collecting or clogging, the semicircular yoke is made double-beveled or V-shaped in cross-section to turn aside the cuttings, which would not be the case if the under side was flat.

It will be noticed, Figs. 2 and 4, that the outer face of the yoke is shouldered at each end to seat the circular knife and that the continuous sharp inner edge joins at each end the top edge of an interior knife and has its ends tapered, bifurcated, and embracing the latter knife, a rivet giving a firm fastening. Thus the ends of the yoke follow the cut of both knives and in no way obstruct.

E is a socket for receiving handle F.

If desired, the knife portion may be of steel cast integral and the fork cast separate and riveted on. The diameter of the cutter and the length of handle may be as desired; but a diameter of seven inches will be found efficient, and the whole device need not weigh over three or four pounds. By using a box holding two or three bushels any one can, in an upright position, quickly chop up a large amount of roots or vegetables.

Having described our invention, what we claim, and desire to secure by Letters Patent, is—

The combination of an annular knife, three parallel interior knives, an interior knife crossing them at right angles, and a semicircular yoke double-beveled or V-shaped in cross-section, shouldered at each end on the outer face to seat the circular knife, and having a continuous sharp inner edge joining at each end the top edge of an interior knife, and having its ends tapered, bifurcated and embracing the said interior knife, as set forth.

In testimony whereof we affix our signatures in presence of two witnesses.

HARRY N. MARSTON.
GEORGE F. MARSTON.

Witnesses:
LUMAN F. BROOKS,
HENRY M. DAY.